US012676860B2

(12) United States Patent
Chintan Shah et al.

(10) Patent No.: US 12,676,860 B2
(45) Date of Patent: Jul. 7, 2026

(54) SYSTEM AND METHOD FOR ADVERTISING SUPPLICANTS IN A NETWORK

(71) Applicant: RAKUTEN SYMPHONY, INC., Tokyo (JP)

(72) Inventors: Paromita Chintan Shah, Bangalore (IN); Nagendra Shridhar Bykampadi, Bangalore (IN); Krishna Pramod Adharapurapu, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 291 days.

(21) Appl. No.: 18/274,587

(22) PCT Filed: Jun. 27, 2023

(86) PCT No.: PCT/US2023/026301
§ 371 (c)(1),
(2) Date: Jul. 27, 2023

(87) PCT Pub. No.: WO2025/005904
PCT Pub. Date: Jan. 2, 2025

(65) Prior Publication Data
US 2025/0007916 A1     Jan. 2, 2025

(51) Int. Cl.
H04L 9/40 (2022.01)

(52) U.S. Cl.
CPC ........ H04L 63/101 (2013.01); H04L 63/0876 (2013.01)

(58) Field of Classification Search
None
See application file for complete search history.

(56) References Cited

U.S. PATENT DOCUMENTS 8,443,187 B1 *   5/2013   Orr ....................... H04W 12/06
                                                       726/5
10,721,230 B2    7/2020   Wei
(Continued)

FOREIGN PATENT DOCUMENTS

EP          3448075 A1      2/2019
WO     WO-2019038038 A1 *   2/2019   ............ H04W 12/10

OTHER PUBLICATIONS

J. Preußß Mattsson, et al. "EAP-TLS 1.3: Using the Extensible Authentication Protocol with TLS 1.3", IETF, Feb. 2022, pp. 1-31 (31 pages), Accessed via the Internet: http://www.rfceditor.org/rfc/rfc9190.pdf.
(Continued)

*Primary Examiner* — Ario Etienne
*Assistant Examiner* — Mohammad Yousuf A. Mian
(74) *Attorney, Agent, or Firm* — Sughrue Mion, PLLC

(57) ABSTRACT

Provided are system, method, and device for enabling network entities to view authenticated supplicants in a network. According to embodiments, the system may include: a memory storage storing computer-executable instructions; and at least one processor communicatively coupled to the memory storage, wherein the at least one processor may be configured to execute the instructions to: create a first authentication list for a first network entity; receive a second authentication list from a second network entity; and create a trust list for the first network entity based on the first authentication list and the second authentication list, wherein the trust list for the first network entity specifies a trust level between the first network entity and one or more network entities in the first and second authentication lists.

18 Claims, 11 Drawing Sheets

(56) References Cited

U.S. PATENT DOCUMENTS

| | | | |
|---|---|---|---|
| 11,659,388 | B2 | 5/2023 | Dashputra et al. |
| 2005/0021964 | A1* | 1/2005 | Bhatnagar ........... H04L 63/0823 |
| | | | 713/175 |
| 2009/0064293 | A1* | 3/2009 | Li ......................... H04L 63/105 |
| | | | 726/6 |
| 2013/0133023 | A1* | 5/2013 | Burstein ............. H04L 63/0892 |
| | | | 726/1 |
| 2022/0345896 | A1 | 10/2022 | Ahmed et al. |
| 2023/0021194 | A1 | 1/2023 | Grayson et al. |
| 2023/0137465 | A1 | 5/2023 | Lo et al. |
| 2024/0214807 | A1 | 6/2024 | Rivera et al. |

OTHER PUBLICATIONS

Rakuten Symphony, "The Definitive Guide to Open RAN Security", Oct. 2022, pp. 1-28 (28 pages total), Accessed via the Internet: https://assets.websitefiles.com/6317e170a9eabbe0fbbf4519/ 63582c8cec69a24b2bcde588_221025- Security-Handbook.pdf?_fsi= ObdMIK2o.
Siwar Ben Hadj Said, "Contextual Connectivity in Multi-Access Architectures", HAL open science, 2015 (204 pages total), Accessed via the Internet: https://hal.science/tel-01206251/document.
N Williams Sun, "On the Use of Channel Bindings to Secure Channels", Network Working Group, RFC 5056, 2007 (23 pages).

* cited by examiner

Start

Create a first authentication list for a
first network entity
S410

Receive a second authentication list
from a second network entity
S420

Create a trust list for the first network
entity based on the first authentication
list and the second authentication list
S430

End

400

Entity M

| Authenticated Port | Role | Source MAC | Destination MAC |
|---|---|---|---|
| AuP1 | Authenticator | M1 | M12 |
| AuP3 | Authenticator | M3 | M5 |
| SuP2 | Supplicant | M2 | M6 |

Entity A

| Authenticated Port | Role | Source MAC | Destination MAC |
|---|---|---|---|
| AuP4 | Authenticator | M4 | M11 |
| SuP5 | Supplicant | M5 | M3 |

Entity N

| Authenticated Port | Role | Source MAC | Destination MAC |
|---|---|---|---|
| AuP6 | Authenticator | M6 | M2 |
| SuP7 | Supplicant | M7 | M8 |

Entity O

| Authenticated Port | Role | Source MAC | Destination MAC |
|---|---|---|---|
| AuP8 | Authenticator | M8 | M7 |
| AuP9 | Authenticator | M9 | M10 |

Start

Receive a first authentication list from
a first network entity
S710

Receive a second authentication list
from a second network entity
S720

Create a trust list for the first network
entity based on the first authentication
list and the second authentication list
S730

End

Start

Create a trust list for the first network entity based on the first authentication list
S910

Update the first authentication list to include the second authentication list in response to receiving the second authentication list
S920

Update the trust list based on the updated first authentication list
S930

End

900

| Entity A | | |
| --- | --- | --- |
| Learned From | Supplicant | Trust Level |
| M5 | M2 | Indirect |
| M5 | M12 | Indirect |
| M5 | M7 | Indirect |
| M4 | M11 | Direct |

FIG. 10C

| Entity A | | | | |
| --- | --- | --- | --- | --- |
| Authenticated Port | Role | Source MAC | Destination MAC | |
| AuP4 | Authenticator | M4 | M11 | |
| SuP5 | Supplicant | M5 | M3 | |
| AuP1 | Authenticator | M1 | M12 | |
| AuP3 | Authenticator | M3 | M5 | |
| SuP2 | Supplicant | M2 | M6 | |

FIG. 10B

| Entity A | | |
| --- | --- | --- |
| Learned From | Supplicant | Trust Level |
| M5 | M2 | Indirect |
| M4 | M11 | Direct |

FIG. 10A

SYSTEM AND METHOD FOR ADVERTISING SUPPLICANTS IN A NETWORK

CROSS REFERENCE TO RELATED APPLICATIONS

This application is a National Stage of International Application No. PCT/US2023/026301 filed Jun. 27, 2023.

TECHNICAL FIELD

Systems, methods, and computer programs consistent with example embodiments of the present disclosure relate to a telecommunication network, and more specifically, relate to enabling network entities to view authenticated supplicants in a telecommunication network.

BACKGROUND

A radio access network (RAN) is an important component in a telecommunications system, as it connects end-user devices (or user equipment) to other parts of the network. The RAN includes a combination of various network elements (NEs) that connect end-users to a core network. Traditionally, hardware and/or software of a particular RAN is vendor specific.

Open RAN (O-RAN) technology has emerged to enable multiple vendors to provide hardware and/or software to a telecommunications system. Since different vendors are involved, the type of hardware and/or software provided may also be different. That is, different types of NEs may be provided by different vendors, and depending on the specific service, the NE could be virtualized in software form (e.g., virtual machine (VM)-based, cloud native functions, etc.), or could be in physical hardware form (e.g., non-VM based).

In an open front haul network of a telecommunications system employing the O-RAN architecture, network entities may employ a port-based network access control IEEE 802.1x in order to regulate access to the network, as well as guard against transmission and reception by unidentified or unauthorized parties, and consequent network disruption, theft of service, or data loss. Network entities may refer to entities such as RAN elements (e.g., O-RAN Centralized Unit (O-CU), O-RAN Distributed Unit (O-DU), O-RAN Radio Unit (O-RU), etc) and Transport Network elements, and may have a role of either an authenticator or a supplicant. Under IEEE 802.1x, data traffic is allowed to pass between network entities only if said network entities are authenticated with each other.

In the related art, information regarding authenticated network entities (e.g., which network entities are authenticated and trustworthy) is kept locally within the corresponding network entities involved in such authentication, and such information is not shared with network entities that are not involved in such authentication. Further, in the related art, network entities may be assumed to be trustworthy if such network entities are connected to an authenticated network entity.

Accordingly, the above approach for authentication of network entity in the related art may have at least the following shortcomings. Since the information regarding authenticated network entities is kept locally and network entities may simply be assumed to be trustworthy by being connected to an authenticated network entity, such process is against the Zero Trust Model of the O-RAN architecture and there is no mechanism for a single network entity in the open front haul network to have a comprehensive view of all the authenticated network entities within the network.

SUMMARY

Example embodiments of the present disclosure enable network entities to view authenticated supplicants in the network. As such, example embodiments of the present disclosure enable the development of a data store of information on authenticated supplicants for the network elements, thus building a comprehensive view of all the authenticated supplicants and defining an explicit level of trust.

According to embodiments, a system is provided. The system may include: a memory storage storing computer-executable instructions; and at least one processor communicatively coupled to the memory storage, wherein the at least one processor may be configured to execute the instructions to: create a first authentication list for a first network entity, wherein the first authentication list specifies one or more network entities that are authenticated with the first network entity; receive a second authentication list from a second network entity, wherein the second authentication list specifies one or more network entities that are authenticated with the second network entity, and wherein the first network entity and the second network entity are authenticated with each other; and create a trust list for the first network entity based on the first authentication list and the second authentication list, wherein the trust list for the first network entity specifies a trust level between the first network entity and one or more network entities in the first and second authentication lists.

According to embodiments, a system is provided. The system may include: a memory storage storing computer-executable instructions; and at least one processor communicatively coupled to the memory storage, wherein the at least one processor may be configured to execute the instructions to: receive a first authentication list from a first network entity, wherein the first authentication list specifies one or more network entities that are authenticated with the first network entity; receive a second authentication list from the second network entity, wherein the second authentication list specifies one or more network entities that are authenticated with the second network entity, and wherein the first network entity and the second network entity are authenticated with each other; and create a trust list for the first network entity based on the first authentication list and the second authentication list, wherein the trust list for the first network entity specifies a trust level between the first network entity and one or more network entities in the first and second authentication lists.

According to embodiments, a method is provided. The method may include: creating a first authentication list for a first network entity, wherein the first authentication list specifies one or more network entities that are authenticated with the first network entity; receiving a second authentication list from a second network entity, wherein the second authentication list specifies one or more network entities that are authenticated with the second network entity, and wherein the first network entity and the second network entity are authenticated with each other; and creating a trust list for the first network entity based on the first authentication list and the second authentication list, wherein the trust list for the first network entity specifies a trust level between the first network entity and one or more network entities in the first and second authentication lists.

According to embodiments, a method is provided. The method may include: receiving a first authentication list from a first network entity, wherein the first authentication list specifies one or more network entities that are authenticated with the first network entity; receiving a second authentication list from the second network entity, wherein the second authentication list specifies one or more network entities that are authenticated with the second network entity, and wherein the first network entity and the second network entity are authenticated with each other; and creating a trust list for the first network entity based on the first authentication list and the second authentication list, wherein the trust list for the first network entity specifies a trust level between the first network entity and one or more network entities in the first and second authentication lists.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein:

FIG. 6 illustrates examples of authentication lists, according to one or more embodiments.

FIG. 10A illustrates an example of a trust list for Network Entity A created based on an authentication list of Network Entity A, according to one or more embodiments.

FIG. 10B illustrates an example of an updated authentication list for Network Entity A, according to one or more embodiments.

FIG. 10C illustrates an example of an updated trust list for Network Entity A, according to one or more embodiments.

DETAILED DESCRIPTION

Figure 1:
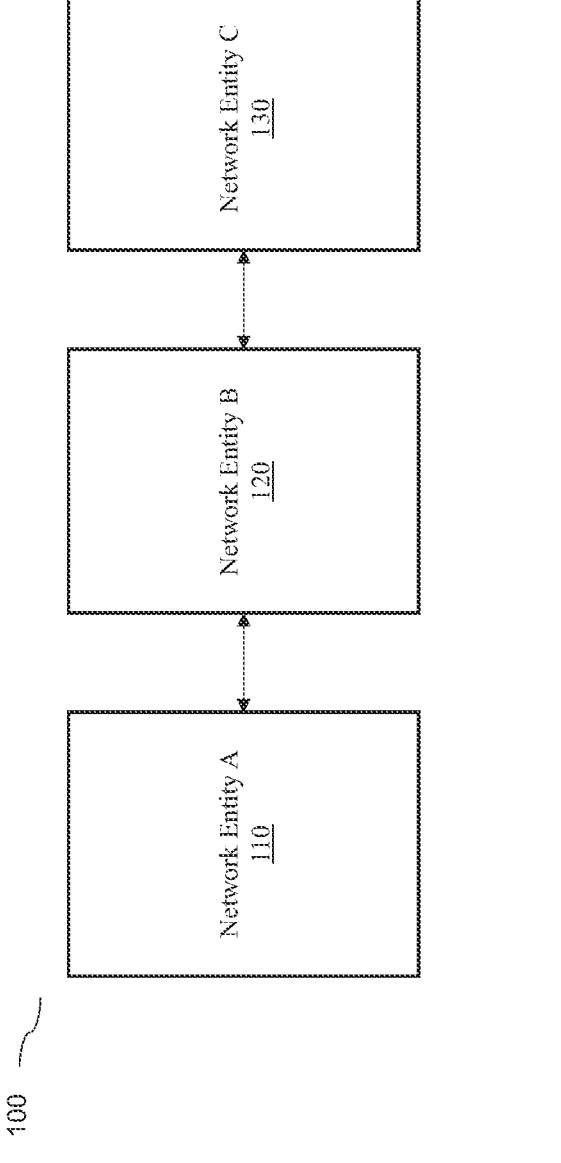
FIG. 1 illustrates a block diagram of an example system configuration for enabling network entities to view authenticated supplicants in a peer-to-peer configuration, according to one or more embodiments.

The following detailed description of example embodiments refers to the accompanying drawings. The same reference numbers in different drawings may identify the same or similar elements.

The foregoing disclosure provides illustration and description but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are disclosed in the specification, these combinations are not intended to limit the disclosure of possible implementations. In fact, many of these features may be combined in ways not specifically disclosed in the specification.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Systems, methods, devices, and the like, provided in the example embodiments of the present disclosure enable network entities to view authenticated supplicants in the network.

According to embodiments, the system may create or receive a first authentication list for a first network entity that specifies one or more network entities that are authenticated with the first network entity, receive a second authentication list from a second network entity that specifies one or more network entities that are authenticated with the second network entity, and then create a trust list for the first network entity based on the first authentication list and the second authentication list, wherein the trust list for the first network entity would specify a trust level between the first network entity and one or more network entities in the first and second authentication lists.

Ultimately, example embodiments of the present disclosure enable network entities to view authenticated supplicants in the network, which in turn enable the development of a data store of information on authenticated supplicants for the network elements, thus building a comprehensive view of all the authenticated supplicants and defining an explicit level of trust.

It is contemplated that features, advantages, and significances of example embodiments described hereinabove are merely a portion of the present disclosure, and are not intended to be exhaustive or to limit the scope of the present disclosure.

Further descriptions of the features, components, configuration, operations, and implementations of the threshold tuning system of the present disclosure, according to one or more embodiments, are provided in the following.

Example System Architecture

FIG. 1 illustrates a block diagram of an example system configuration 100 for enabling network entities to view authenticated supplicants in a peer-to-peer configuration, according to one or more embodiments. As illustrated in FIG. 1, system configuration 100 may include a plurality of network entities (e.g., Network Entity A 110, Network Entity B 120, and Network Entity C 130) that are communicatively coupled to each other in a peer-to-peer configuration.

Each of the plurality of network entities 110, 120, 130 may include a system, a platform, a module, or the like, which may be configured to perform one or more operations or actions for enabling network entities to view authenticated supplicants in a network. According to embodiments, the plurality of network entities 110, 120, 130 may include entities such as RAN elements (e.g., O-RAN Centralized Unit (O-CU), O-RAN Distributed Unit (O-DU), O-RAN Radio Unit (O-RU), etc) and Transport Network elements.

Figure 2:
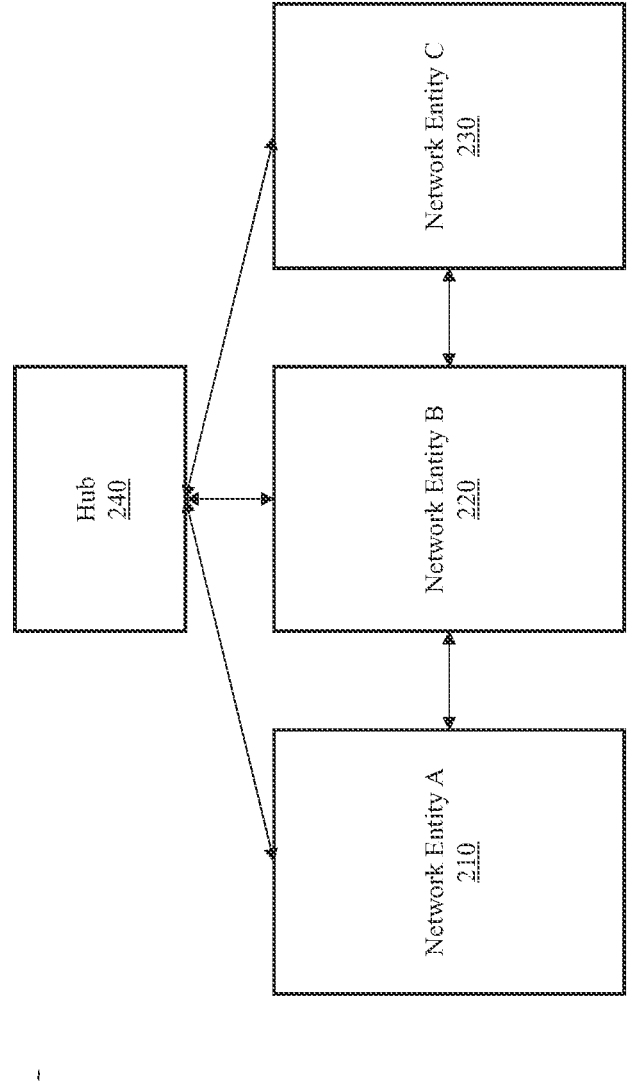
FIG. 2 illustrates a block diagram of an example system configuration for enabling network entities to view authenticated supplicants in a hub-and-spoke configuration, according to one or more embodiments.

FIG. 2 illustrates a block diagram of an example system configuration 200 for enabling network entities to view authenticated supplicants in a hub-and-spoke configuration, according to one or more embodiments. As illustrated in FIG. 2, system configuration 200 may include a plurality of network entities (e.g., Network Entity A 210, Network Entity B 220, and Network Entity C 230) that are communicatively coupled to each other, and a hub 240 that is communicatively coupled to each of the plurality of network entities 210, 220, 230 in a hub-and-spoke configuration.

The hub 240 may include a system, a platform, a module, or the like, which may be configured to perform one or more operations or actions for enabling network entities to view authenticated supplicants in a network.

According to embodiments, the plurality of network entities 210, 220, 230 may include entities such as RAN elements (e.g., O-RAN Centralized Unit (O-CU), O-RAN Distributed Unit (O-DU), O-RAN Radio Unit (O-RU), etc) and Transport Network elements.

According to embodiments, the hub 240 may include a centralized service that acts as a central point of communication for the plurality of network entities 210, 220, 230. According to embodiments, the hub 240 may be hosted on any element in the open front haul network that has a communication path to the plurality of network entities 210, 220, 230, such as a Service Management Orchestrator (SMO) or an IEEE 802.1x Authentication Server.

It can be understood that the configuration illustrated in FIG. 1 and FIG. 2 are simplified for descriptive purpose, and is not intended to limit the scope of the present disclosure in any way. For example, in practice, the number of network entities in the system can be any number.

Example operations performable by the plurality of network entities 110, 120, 130 for enabling network entities to view authenticated supplicants are described below with reference to FIG. 4, and example operations performable by the hub 240 for enabling network entities to view authenticated supplicants are described below with reference to FIG. 7. Further, several example components which may be included in the plurality of network entities 110, 120, 130 and the hub 240, according to one or more embodiments, are described below with reference to FIG. 3.

Figure 3:
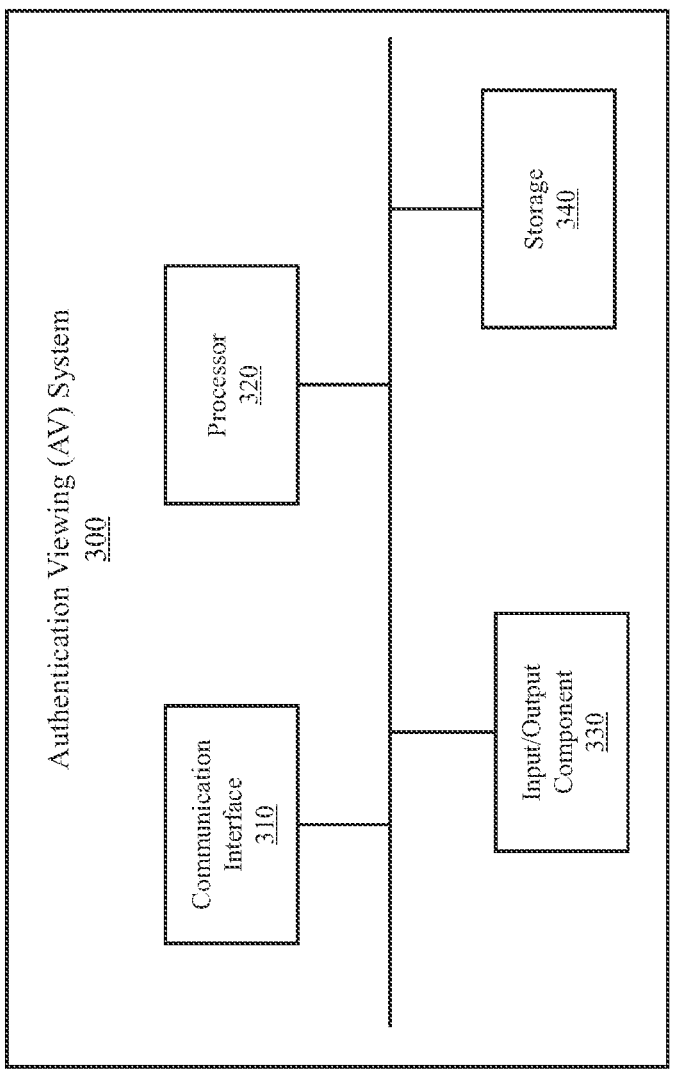
FIG. 3 illustrates a block diagram of example components in an authentication viewing (AV) system, according to one or more embodiments.

FIG. 3 illustrates a block diagram of example components in an authentication viewing (AV) system 300, according to one or more embodiments. The AV system 300 may corresponds to at least one network entity of the plurality of network entities 110, 120, 130 in FIG. 1, or corresponds to the hub 240 in FIG. 2, thus the features associated with the plurality of network entities 110, 120, 130 and the hub 240 and the AV system 300 may be similarly applicable to each other, unless being explicitly described otherwise.

As illustrated in FIG. 3, the AV system 300 may include at least one communication interface 310, at least one processor 320, at least one input/output component 330, and at least one storage 340, although it can be understood that the AV system 300 may include more or less components than as illustrated in FIG. 3, and/or may be arranged in a manner different from as illustrated in FIG. 3, without departing from the scope of the present disclosure.

The communication interface 310 may include at least one transceiver-like component (e.g., a transceiver, a separate receiver and transmitter, a bus, etc.) that enables the components of the AV system 300 to communicate with each other and/or to communicate with one or more components external to the AV system 300, such as via a wired connection, a wireless connection, or a combination of wired and wireless connections.

For instance, the communication interface 310 may couple the processor 320 to the storage 340 to thereby enable them to communicate and to interoperate with each other in performing one or more operations. As another example, communication interface 310 may couple the AV system 300 (or one or more components included therein) to a separate network entity, so as to enable them to communicate and to interoperate with each other.

According to one or more embodiments, the communication interface 310 may include one or more application programming interfaces (APIs) which allow the AV system 300 (or one or more components included therein) to communicate with one or more software applications.

The input/output component 330 may include at least one component that permits the AV system 300 to receive information and/or to provide output information. It can be understood that, in some embodiments, the input/output component 330 may include at least one input component (e.g., a touch screen display, a button, a switch, a microphone, a sensor, etc.) and at least one output component (e.g., a display, a speaker, one or more light-emitting diodes (LEDs), etc.), each of which may be separated from each other.

The storage 340 may include one or more storage mediums suitable for storing data, information, and/or computer-executable instructions therein. According to embodiments, the storage 340 may include at least one memory storage, such as a random access memory (RAM), a read only memory (ROM), and/or another type of dynamic or static storage device (e.g., a flash memory, a magnetic memory, and/or an optical memory) that stores information and/or instructions for use by the processor 320. Additionally or alternatively, the storage 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

According to embodiments, the storage 340 may be configured to store information, such as raw data, metadata, or the like. Additionally or alternatively, the storage 340 may be configured to store one or more information associated with one or more operations performed by the processor 320. For instance, the storage 340 may store information defining the historical operation(s) performed by the processor 320 to enable network entities to view authenticated supplicants, one or more results of operations performed by the processor 320, or the like. Further, the storage 340 may store data or information required in enabling network entities to view authenticated supplicants. For instance, the storage 340 may store authentication lists and/or trust lists (described below with reference to FIG. 6 and FIG. 10).

In some implementation, the storage 340 may include a plurality of storage mediums, and the storage 340 may be configured to store a duplicate or a copy of at least a portion of the information in the plurality of storage mediums, for providing redundancy and for backing-up the information or the associated data. Furthermore, the storage 340 may also store computer-readable or computer-executable instructions which, when being executed by one or more processors (e.g., processor 320), causes the one or more processors to perform one or more actions/operations described herein The processor 320 may include at least one processor capable of being programmed or being configured to perform a function(s) or an operation(s) described herein. For instance, the processor 320 may be configured to execute computer-executable instructions stored in at least one storage medium or a memory storage (e.g., storage 340, etc.) to thereby perform one or more actions or one or more operations described herein.

According to embodiments, the processor 320 may be configured to receive (e.g., via the communication interface 310, via the input/output component 330, etc.) one or more signals and/or one or more user inputs defining one or more instructions for performing one or more operations. Further, the processor 320 may be implemented in hardware, firmware, or a combination of hardware and software. For instance, processor 320 may include at least one of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing or computing component.

According to embodiments, the processor 320 may be configured to collect, to extract, and/or to receive one or more information (in the form of signal or data, etc.), and to process the received one or more information to thereby enable network entities to view authenticated supplicants.

Descriptions of several example operations which may be performed by the processor 320 are provided below with reference to FIG. 4 to FIG. 10.

Example Operations for Enabling Network Entities to View Authenticated Supplicants in a Peer-to-Peer Configuration in the Present Disclosure In the following, several example operations performable by the AV system of the present disclosure are described with reference to FIG. 4 to FIG. 6.

Figure 4:
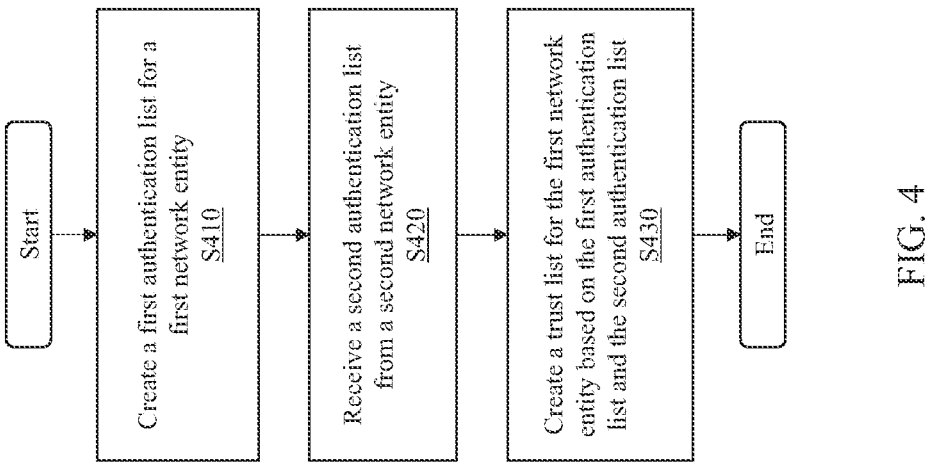
FIG. 4 illustrates a flow diagram of an example method for enabling network entities to view authenticated supplicants in a peer-to-peer configuration, according to one or more embodiments.

FIG. 4 illustrates a flow diagram of an example method 400 for enabling network entities to view authenticated supplicants in a peer-to-peer configuration, according to one or more embodiments. One or more operations in method 400 may be performed by at least one processor (e.g., processor 320) of the AV system, which may corresponds to at least one network entity (i.e., first network entity) of the plurality of network entities in the system.

As illustrated in FIG. 4, at operation S410, the at least one processor may be configured to create a first authentication list for the first network entity. According to embodiments, the first authentication list may specify one or more network entities that are authenticated with the first network entity. In particular, according to embodiments, the first authentication list may specify one or more MAC address of one or more ports of the first network entity (herein after "one or more first MAC address"), and one or more MAC address of one or more ports of one or more network entities authenticated with the one or more first MAC address. According to embodiments, the first authentication list may also specify a role of the one or more ports of the first network entity, such as an authenticator and a supplicant.

Figure 5:
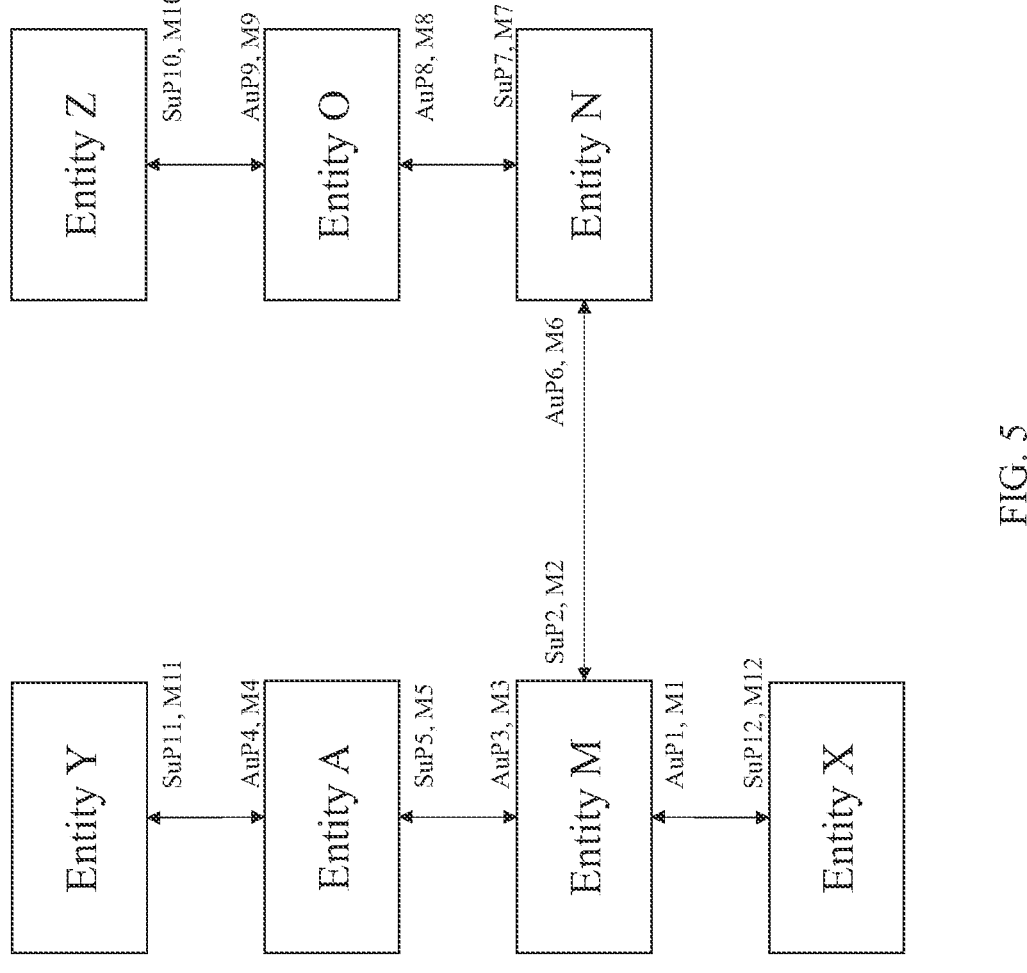
FIG. 5 illustrates an example configuration of network entities in a peer-to-peer configuration, according to one or more embodiments.

For example, referring to FIG. 5, which illustrates an example configuration of network entities in a peer-to-peer configuration, according to one or more embodiments. As shown in FIG. 5, the system may comprise 7 network entities: Network Entity Y, Network Entity A, Network Entity M, Network Entity X, Network Entity Z, Network Entity O, and Network Entity N.

As shown in FIG. 5, for example, Network Entity A is authenticated with Network Entity Y and Network Entity M; where port AuP4 of Network Entity A has a MAC address M4 and a role of an authenticator that is authenticated with port SuP11 of Network Entity Y, which as a MAC address M11 and a role of a supplicant; and where port SuP5 of Network Entity A has a MAC address M5 and a role of a supplicant that is authenticated with port AuP3 of Network Entity M, which as a MAC address M3 and a role of an authenticator. Similar explanation applies to Network Entity Y, Network Entity M, Network Entity X, Network Entity Z, Network Entity O, and Network Entity N.

It may be understood that the authentication between the network entities may be performed based on a port-based network access control IEEE 802.1x with a IEEE 802.1x authentication server. In particular, as part of the Extensible Authentication Protocol (EAP) over LAN (EAPoL) process, a network entity acting as an authenticator request an identity information from network entities acting as the supplicants, and relays said identity information to the authentication server. The authentication server then validates the identity information of the network entities acting as the supplicants and determines if said network entities are authorized to access the network. If said network entities acting as the supplicants are authorized to access the network, said network entities acting as the supplicants are authenticated with said network entity acting as the authenticator. Through the above authentication process, the network entities involved in the authentication process are able to obtain information such as port identity, port MAC address, role of the ports, authorization status, etc from each other.

FIG. 6 illustrates examples of authentication lists, according to one or more embodiments. As shown in FIG. 6, for example, Network Entity A may be configured to create its the authentication list, where such authentication list may specify the MAC addresses M4 and M5 of ports AuP4 and SuP5 of Network Entity A, as well as the MAC addresses M11 of ports SuP11 of Network Entity Y that is authenticated with port AuP4, and the MAC addresses M3 of ports AuP3 of Network Entity M that is authenticated with port SuP5. Further, the authentication list for Network Entity A may also specify that port AuP4 of Network Entity A has a role of an authenticator, and port SuP5 of Network Entity A has a role of a supplicant. As such, the authentication list may specify Network Entity Y and Network Entity M (which have ports SuP11 and AuP3) that are authenticated with Network Entity A (which has ports AuP4 and SuP5). Similar explanation applies to Network Entity Y, Network Entity M, Network Entity X, Network Entity Z, Network Entity O, and Network Entity N. Since Network Entity Y, Network Entity X, and Network Entity Z have only one port, the authentication list for said network entities are omitted from FIG. 6. The method then proceeds to operation S420.

According to embodiments, the at least one processor may be configured to perform, at a regular period of time, an SNMPv3 query of an OID "1.3.111.2.802.1.1.15.2.2.3". Subsequently, based on a SNMPv3 response (which would show the status of an Object-Type "ieee8021XPaeLogonGroup"), the at least one processor may then create the authentication list.

According to embodiments, the at least one processor may also be configured to transmit the first authentication list to the one or more network entities that are authenticated with the first network entity.

At operation S420, the at least one processor may be configured to receive a second authentication list from a second network entity. According to embodiments, the first network entity and the second network entity may be authenticated with each other. According to embodiments, similar to the first authentication list, the second authentication list may specify one or more network entities that are authenticated with the second network entity. In particular, according to embodiments, the second authentication list may specify one or more MAC address of one or more ports of the second network entity (herein after "one or more second MAC address"), and one or more MAC address of one or more ports of one or more network entities authenticated with the one or more second MAC address. According to embodiments, the second authentication list may also specify a role of the one or more ports of the second network entity, such as an authenticator and a supplicant.

For example, returning to FIG. 5 and FIG. 6, Network Entity A may receive an authentication list of Network Entity M shown in FIG. 6 from Network Entity M (which is authenticated with Network entity A). The method then proceeds to operation S430.

According to embodiments, the transmitting of the first authentication list and the receiving of the second authentication list may be done via an advertising interface.

At operation S430, the at least one processor may be configured to create a trust list for the first network entity based on the first authentication list and the second authentication list. According to embodiments, the trust list for the first network entity specify a trust level between the first network entity and one or more network entities in the first and second authentication lists.

For example, returning to FIG. 5 and FIG. 6, since the authentication list of Network Entity A specify Network Entity Y and Network Entity M (which are authenticated with Network Entity A) and since the authentication list of Network Entity M specify Network Entity X and Network Entity N (which are authenticated with Network Entity M via port MAC addresses M12 and M6), the trust list for Network Entity A may specify a trust level between Network Entity A and Network Entity Y, Network Entity M, Network Entity X, and Network Entity N.

Examples of operations for creating a trust list are described below with reference to FIG. 9.

Upon performing operation S430, the method 400 may be ended or be terminated. Alternatively, method 400 may return to operation S420, such that the at least one processor may be configured to repeatedly perform, for at least a predetermined amount of time, the receiving the second authentication list (at operation S420) and the creating the trust list (at operation S430). For instance, the at least one processor may continuously (or periodically) receive a plurality of authentication lists from a plurality of network entities, and then restart the receiving the second authentication list (at operation S420) and the creating the trust list (at operation S430).

To this end, the system of the present disclosure may enable network entities to view authenticated supplicants in the network.

Example Operations for Enabling Network Entities to View Authenticated Supplicants in a Hub-and-Spoke Configuration in the Present Disclosure In the following, several example operations performable by the AV system of the present disclosure are described with reference to FIG. 7, FIG. 6, and FIG. 8.

Figure 7:
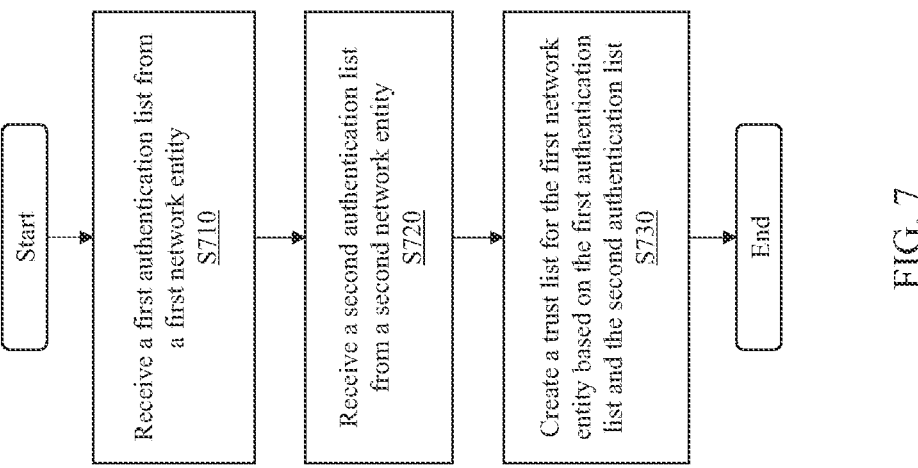
FIG. 7 illustrates a flow diagram of an example method for enabling network entities to view authenticated supplicants in a hub-and-spoke configuration, according to one or more embodiments.

FIG. 7 illustrates a flow diagram of an example method 700 for enabling network entities to view authenticated supplicants in a hub-and-spoke configuration, according to one or more embodiments. One or more operations in method 700 may be performed by at least one processor (e.g., processor 320) of the AV system, which may corresponds to the hub communicatively coupled to the plurality of network entities in the system.

As illustrated in FIG. 7, at operation S710, the at least one processor may be configured to receive a first authentication list from the first network entity. The first authentication list may be similar to the first authentication list described above in relation to method 400.

Figure 8:
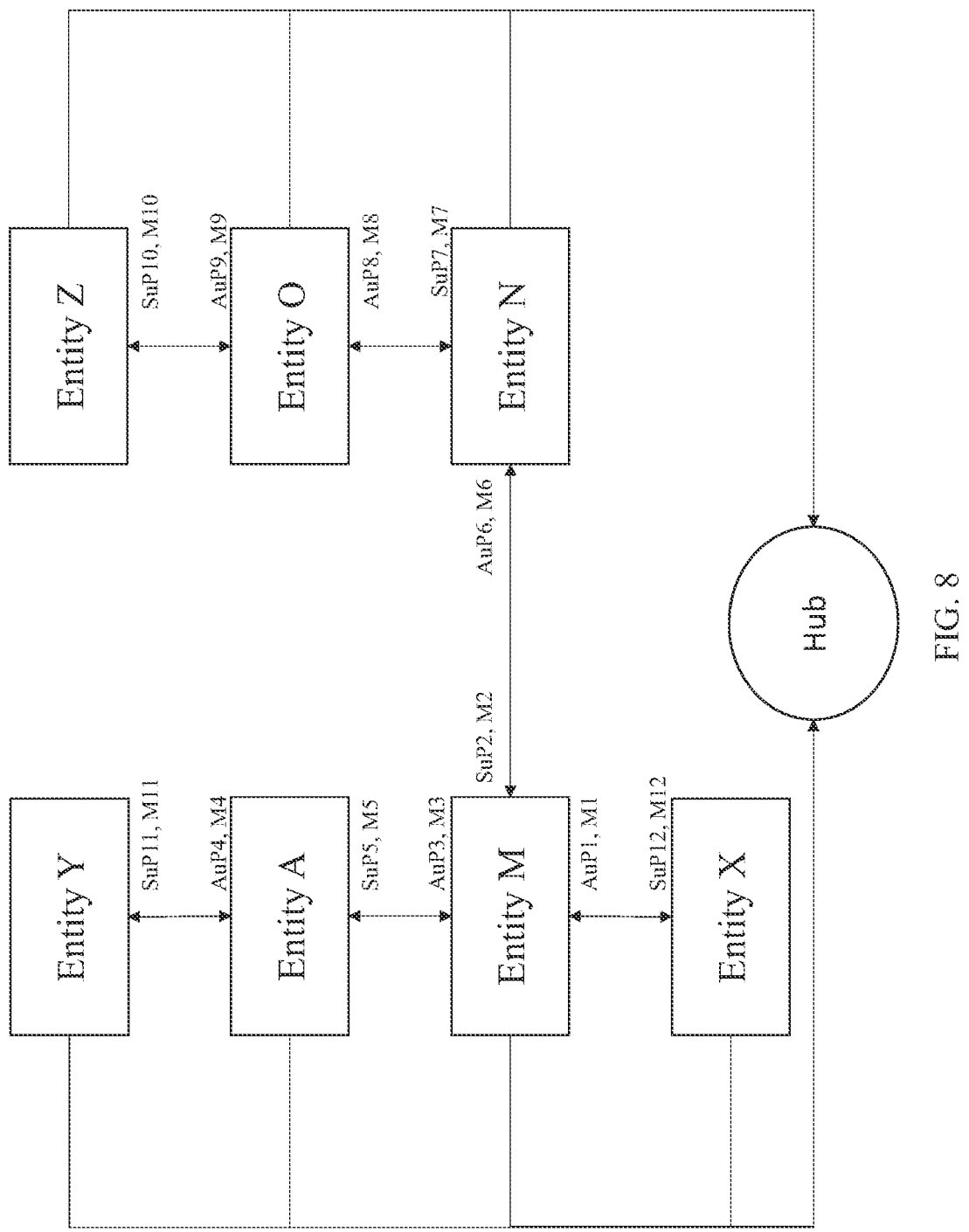
FIG. 8 illustrates an example configuration of network entities in a hub-and-spoke configuration, according to one or more embodiments.

For example, referring to FIG. 8, which illustrates an example configuration of network entities in a hub-and-spoke configuration, according to one or more embodiments. The example configuration of network entities in a hub-and-spoke configuration shown in FIG. 8 is similar to the example configuration of network entities in a peer-to-peer configuration shown in FIG. 5, with an addition of the hub that is communicatively coupled to each of Network Entity Y, Network Entity A, Network Entity M, Network Entity X, Network Entity Z, Network Entity O, and Network Entity N.

As shown in FIG. 8, for example, the hub may be configured to receive the authentication list of Network Element A (e.g., the authentication list of Network Element A shown in FIG. 6) from Network Element A. The method then proceeds to operation S720.

At operation S720, the at least one processor may be configured to receive a second authentication list from a second network entity. According to embodiments, the first network entity and the second network entity may be authenticated with each other. The second authentication list may be similar to the second authentication list described above in relation to method 400.

For example, returning to FIG. 6 and FIG. 8, the hub may receive an authentication list of Network Entity M shown in FIG. 6 from Network Entity M (which is authenticated with Network entity A). The method then proceeds to operation S730.

According to embodiments, the receiving of the first authentication list and the second authentication list may be done via an advertising interface.

At operation S730, the at least one processor may be configured to create a trust list for the first network entity based on the first authentication list and the second authentication list. The trust list may be similar to the trust list described above in relation to method 400.

For example, returning to FIG. 6 and FIG. 8, since the authentication list of Network Entity A specify Network Entity Y and Network Entity M (which are authenticated with Network Entity A) and since the authentication list of Network Entity M specify Network Entity X and Network Entity N (which are authenticated with Network Entity M via port MAC addresses M12 and M6), the trust list for Network Entity A may specify a trust level between Network Entity A and Network Entity Y, Network Entity M, Network Entity X, and Network Entity N.

Examples of operations for creating a trust list are described below with reference to FIG. 9.

Upon performing operation S730, the method 700 may be ended or be terminated. Alternatively, method 700 may return to operation S720, such that the at least one processor may be configured to repeatedly perform, for at least a predetermined amount of time, the receiving the second authentication list (at operation S720) and the creating the trust list (at operation S730). For instance, the at least one processor may continuously (or periodically) receive a plurality of authentication lists from a plurality of network entities, and then restart the receiving the second authentication list (at operation S720) and the creating the trust list (at operation S730).

To this end, the system of the present disclosure may enable network entities to view authenticated supplicants in the network.

Example Operations for Creating a Trust List in the Present Disclosure

In the following several example operations performable by the at least one processor for creating a trust list are described with reference to FIG. 9 and FIG. 10.

Figure 9:
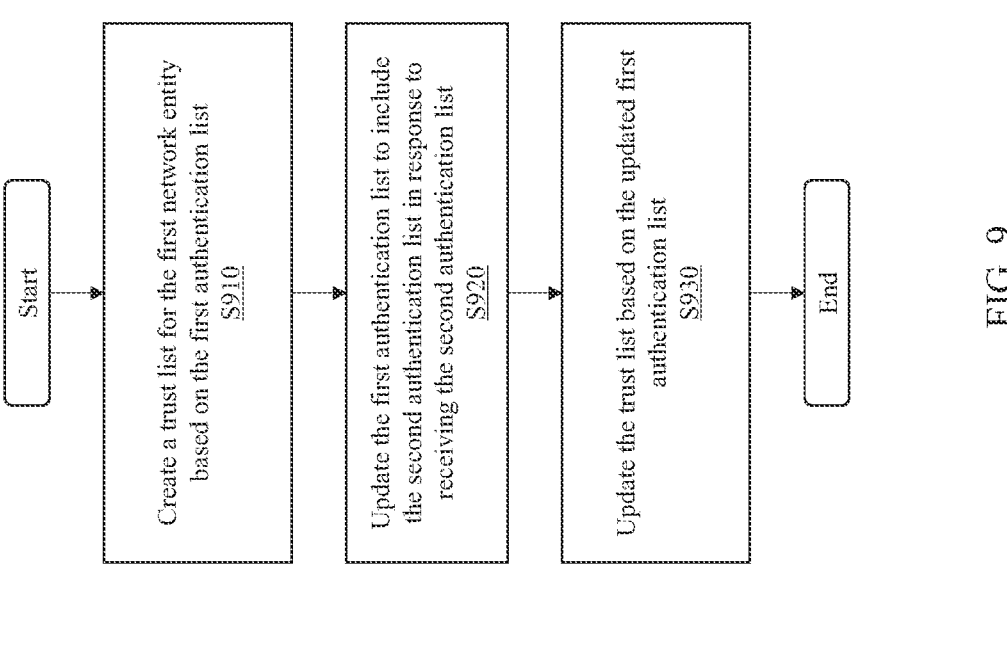
FIG. 9 illustrates a flow diagram of an example method for creating a trust list, according to one or more embodiments.

FIG. 9 illustrates a flow diagram of an example method 900 for creating a trust list, according to one or more embodiments. One or more operations in method 900 may be performed by at least one processor (e.g., processor 320) of the AV system, which may correspond to at least one network entity (i.e., first network entity) of the plurality of network entities in the system, or may correspond to the hub communicatively coupled to the plurality of network entities in the system.

According to embodiments, the trust list may form a network-level authenticated supplicant table.

As illustrated in FIG. 9, at operation S910, the at least one processor may be configured to create a trust list for the first network entity based on the first authentication list. According to embodiments, the trust list created for the first network entity based on the first authentication list may specify a trust level between the first network entity and the one or more network entities in the first authentication list.

In particular, according to embodiments, the trust level may be one of direct trust and indirect trust, and may be between one or more ports of the first network entity and one or more ports of the one or more network entities in the first authentication list that has a role of a supplicant. According to embodiments, the trust list for the first network entity may comprises one or more MAC address of the one or more ports of the first network entity and one or more MAC address of the one or more ports of the one or more network entities in the first authentication list that has the role of the supplicant.

For example, referring to FIG. 10A, which illustrates an example of trust list for Network Entity A created based on an authentication list of Network Entity A, according to one or more embodiments. As shown in FIG. 10A, the trust list for Network Entity A specify MAC addresses M5 and M4 of ports SuP5 and AuP4 of Network Entity A.

Further, since the port of Network Entity Y (which is in the authentication list of Network Entity A) that has a role of a supplicant (i.e., SuP11) is authenticated with port AuP4 of Network Entity A, the trust list for Network Entity A specify MAC address M11 of said port SuP11 and specify that the trust level between port SuP11 of Network Entity Y and port AuP4 of Network Entity A is a direct trust.

On the other hand, since the port of Network Entity M (which is in the authentication list of Network Entity A) that has a role of a supplicant (i.e., SuP2) is authenticated with port SuP5 of Network Entity A via port AuP3 of Network Entity M, the trust list for Network Entity A specify MAC address M2 of said port SuP2 and specify that the trust level between port SuP2 of Network Entity M and port SuP5 of Network Entity A is an indirect trust. The method may then proceeds to operation S920.

At operation S920, the at least one processor may be configured to update the first authentication list to include the second authentication list in response to receiving the second authentication list.

For example, referring to FIG. 10B, which illustrates an example of updated authentication list for Network Entity A, according to one or more embodiments. As shown in FIG. 10B, the authentication list for Network Entity A is updated to include the authentication list for Network Entity M in FIG. 6. The method may then proceeds to operation S930.

According to embodiments, in a peer-to-peer configuration, the at least one processor may also be configured to transmit the updated first authentication list to the one or more network entities that are authenticated with the first network entity. Accordingly, the second authentication list that is received may also further specify one or more network entities that are authenticated with a third network entity that is authenticated with the second network entity.

At operation S930, the at least one processor may be configured to update the trust list based on the updated first authentication list. According to embodiments, the updated trust list may further specify a trust level between the first network entity and the one or more network entities in the second authentication list.

In particular, according to embodiments, the trust level may be one of direct trust and indirect trust, and may further be between one or more ports of the first network entity and one or more ports of the one or more network entities in the second authentication list (which is now included in the first authentication list) that has a role of a supplicant. According to embodiments, the trust list for the first network entity may comprises one or more MAC address of the one or more ports of the first network entity and one or more MAC address of the one or more ports of the one or more network entities in the second authentication list that has the role of the supplicant.

For example, referring to FIG. 10C, which illustrates an example of updated trust list for Network Entity A, according to one or more embodiments. In particular, since the port of Network Entity X (which is in the authentication list of Network Entity M that is now included in the authentication list of Network Entity A) that has a role of a supplicant (i.e., SuP12) is authenticated with port SuP5 of Network Entity A via ports AuP1 and AuP3 of Network Entity M, the trust list for Network Entity A further specify MAC address M12 of said port SuP12 and specify that the trust level between port SuP12 of Network Entity X and port SuP5 of Network Entity A is an indirect trust. Similarly, since the port of Network Entity N (which is in the authentication list of Network Entity M that is now included in the authentication list of Network Entity A) that has a role of a supplicant (i.e., SuP7) is authenticated with port SuP5 of Network Entity A via ports AuP6 of Network Entity N and ports SuP2 and AuP3 of Network Entity M, the trust list for Network Entity A further specify MAC address M7 of said port SuP7 and specify that the trust level between port SuP7 of Network Entity N and port SuP5 of Network Entity A is an indirect trust.

It may be understood that ports of Network Entity A itself that is in the authentication list of Network Entity M that is now included in the authentication list of Network Entity A may be ignored in the above process.

Upon performing operation S930, the method 900 may be ended or be terminated. Alternatively, method 900 may return to operation S920, such that the at least one processor may be configured to repeatedly perform, the updating the first authentication list (at operation S920) and the updating the trust list (at operation S930) until each of the plurality of network entities have a comprehensive view of all the authenticated network entities within the network.

For example, in a peer-to-peer configuration, after the authentication list for Network Entity A is updated to include the authentication list for Network Entity M and the trust list for Network Entity A is updated based on the updated authentication list as described above, Network Entity M may receive an authentication list for Network Entity N from Network Entity N (which specify Network Entity O that is authenticated with Network Entity N). The authentication list for Network Entity M may then be updated to include the authentication list for Network Entity N (such that the authentication list for Network Entity N now specify Network Entity O) and the trust list for Network Entity M is updated based on the updated authentication list in the similar manner as described above. Subsequently, Network Entity M may then transmit its updated authentication list to Network Entity A again, where the process is repeated and the authentication list and the trust list for Network Entity A are updated to now also specify Network Entity O. The above process may be repeated until each of the plurality of network entities have a comprehensive view of all the authenticated network entities within the network.

Accordingly, for example, if Network Entity Z acts as an O-DU and Network Entity X acts as an O-RU, the above methods allows for the O-DU and the O-RU to form an indirect trust between each other, even though the O-DU and the O-RU are not authenticated with each other.

It can be understood that the configuration illustrated in FIG. 5, FIG. 6. FIG. 8, and FIGS. 10A to 10C are simplified for descriptive purpose, and is not intended to limit the scope of the present disclosure in any way. For example, in practice, the number of network entities in the system can be any number, the number of ports in each of the plurality of network entities can be any number, each of the plurality of network entities may be authenticated with any other network entities, etc. Similarly, the authentication list and the trust list can be in any other form and can include any additional information in accordance with use.

Example Implementation Environment

Figure 11:
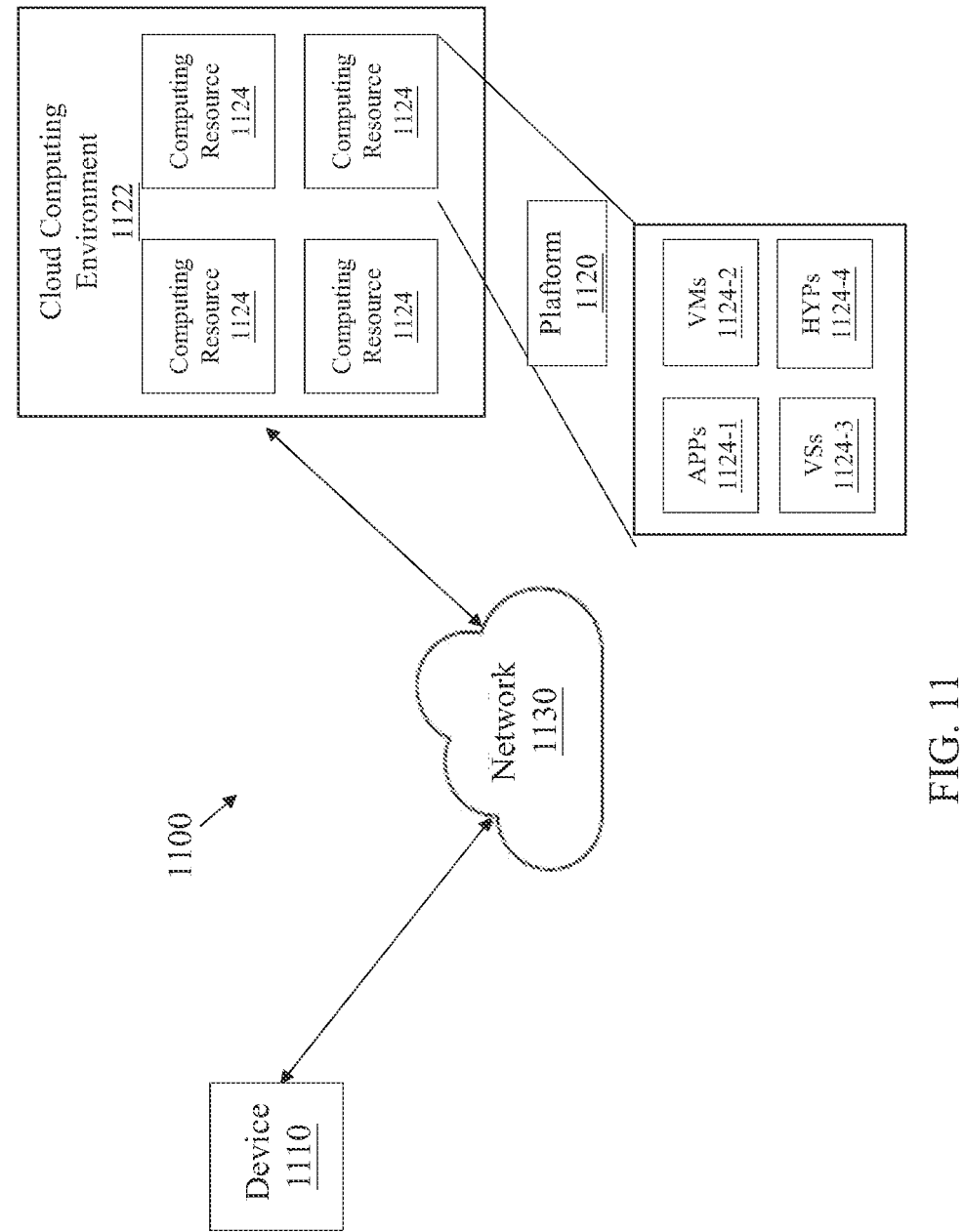
FIG. 11 illustrates a diagram of an example environment in which systems and/or methods, described herein, may be implemented.

FIG. 11 illustrates a diagram of an example environment 1100 in which systems and/or methods, described herein, may be implemented. As shown in FIG. 11, environment 1100 may include a device 1110, a platform 1120, and a network 1130. Devices of environment 1100 may interconnect via wired connections, wireless connections, or a combination of wired and wireless connections. In some embodiments, any of the functions and operations described with reference to FIG. 1 to FIG. 10 above may be performed by any combination of elements illustrated in FIG. 11.

According to embodiments, the AV system described herein may be stored, hosted, or deployed in the cloud computing platform 1120. In this regard, device 1110 may include a device, system, equipment, or the like, utilized by the user (e.g., user of a marketing team, user of a network planning team, etc.) to access the AV system. In that case, device 1110 may include one or more devices capable of receiving, generating, storing, processing, and/or providing information associated with platform 1120.

Platform 1120 includes one or more devices capable of receiving, generating, storing, processing, and/or providing information. In some implementations, platform 1120 may include a cloud server or a group of cloud servers. In some implementations, platform 1120 may be designed to be modular such that certain software components may be swapped in or out depending on a particular need. As such, platform 1120 may be easily and/or quickly reconfigured for different uses.

In some implementations, as shown, platform 1120 may be hosted in cloud computing environment 1122. Notably, while implementations described herein describe platform 1120 as being hosted in cloud computing environment 1122, in some implementations, platform 1120 may not be cloud-based (i.e., may be implemented outside of a cloud computing environment) or may be partially cloud-based.

Cloud computing environment 1122 includes an environment that hosts platform 1120. Cloud computing environment 1122 may provide computation, software, data access, storage, etc. services that do not require end-user (e.g., user device 1110) knowledge of a physical location and configuration of system(s) and/or device(s) that hosts platform 1120. As shown, cloud computing environment 1122 may include a group of computing resources 1124 (referred to collectively as "computing resources 1124" and individually as "computing resource 1124").

Computing resource 1124 includes one or more personal computers, a cluster of computing devices, workstation computers, server devices, or other types of computation and/or communication devices. In some implementations, computing resource 1124 may host platform 1120. The cloud resources may include compute instances executing in computing resource 1124, storage devices provided in computing resource 1124, data transfer devices provided by computing resource 1124, etc. In some implementations, computing resource 1124 may communicate with other computing resources 1124 via wired connections, wireless connections, or a combination of wired and wireless connections.

As further shown in FIG. 11, computing resource 1124 includes a group of cloud resources, such as one or more applications ("APPs") 1124-1, one or more virtual machines ("VMs") 1124-2, virtualized storage ("VSs") 1124-3, one or more hypervisors ("HYPs") 1124-4, or the like.

Application 1124-1 includes one or more software applications that may be provided to or accessed by user device 1110. Application 1124-1 may eliminate a need to install and execute the software applications on user device 1110. For example, application 1124-1 may include software associated with platform 1120 and/or any other software capable of being provided via cloud computing environment 1122. In some implementations, one application 1124-1 may send/receive information to/from one or more other applications 1124-1, via virtual machine 1124-2.

Virtual machine 1124-2 includes a software implementation of a machine (e.g., a computer) that executes programs like a physical machine. Virtual machine 1124-2 may be either a system virtual machine or a process virtual machine, depending upon use and degree of correspondence to any real machine by virtual machine 1124-2. A system virtual machine may provide a complete system platform that supports execution of a complete operating system ("OS"). A process virtual machine may execute a single program, and may support a single process. In some implementations, virtual machine 1124-2 may execute on behalf of a user (e.g., user device 1110), and may manage infrastructure of cloud computing environment 1122, such as data management, synchronization, or long-duration data transfers.

Virtualized storage 1124-3 includes one or more storage systems and/or one or more devices that use virtualization techniques within the storage systems or devices of computing resource 1124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 1124-4 may provide hardware virtualization techniques that allow multiple operating systems (e.g., "guest operating systems") to execute concurrently on a host computer, such as computing resource 1124. Hypervisor 1124-4 may present a virtual operating platform to the guest operating systems, and may manage the execution of the guest operating systems. Multiple instances of a variety of operating systems may share virtualized hardware resources.

Network 1130 may include one or more wired and/or wireless networks. For example, network 1130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 11 are provided as an example. In practice, there may be additional devices and/or networks, fewer devices and/or networks, different devices and/or networks, or differently arranged devices and/or networks than those shown in FIG. 11. Furthermore, two or more devices shown in FIG. 11 may be implemented within a single device, or a single device shown in FIG. 11 may be implemented as multiple, distributed devices. Additionally, or alternatively, a set of devices (e.g., one or more devices) of environment 1100 may perform one or more functions described as being performed by another set of devices of environment 1100.

Various Aspects of Embodiments

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s) module, segment, or portion of instructions, which comprises one or more executable instructions for implementing the specified logical function (s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

Various further respective aspects and features of embodiments of the present disclosure may be defined by the following items:

Item [1]: A system that may include: a memory storage storing computer-executable instructions; and at least one processor communicatively coupled to the memory storage, wherein the at least one processor may be configured to execute the instructions to: create a first authentication list for a first network entity, wherein the first authentication list specifies one or more network entities that are authenticated with the first network entity; receive a second authentication list from a second network entity, wherein the second authentication list specifies one or more network entities that are authenticated with the second network entity, and wherein the first network entity and the second network entity are authenticated with each other; and create a trust list for the first network entity based on the first authentication list and the second authentication list, wherein the trust list for the first network entity specifies a trust level between the first network entity and one or more network entities in the first and second authentication lists.

Item [2]: The system according to item [1], wherein: the trust level may include one of direct trust and indirect trust; and the trust level may be between one or more ports of the first network entity and one or more ports of the one or more network entities in the first and second authentication lists that has a role of a supplicant.

Item [3]: The system according to item [2], wherein the trust list for the first network entity may include one or more MAC address of the one or more ports of the first network entity and one or more MAC address of the one or more ports of the one or more network entities in the first and second authentication lists that has the role of the supplicant.

Item [4]: The system according to any one of items [1]-[3], wherein the at least one processor may be configured to execute the instructions to create the trust list for the first network entity based on the first authentication list and the second authentication list by: creating the trust list based on the first authentication list, such that the trust list specifies a trust level between the first network entity and the one or more network entities in the first authentication list; in response to receiving the second authentication list, updating the first authentication list to include the second authentication list; and updating the trust list based on the updated first authentication list, such that the trust list further specifies a trust level between the first network entity and the one or more network entities in the second authentication list.

Item [5]: The system according to item [4], wherein the at least one processor may be further configured to execute the instructions to transmit the updated first authentication list to the one or more network entities that are authenticated with the first network entity.

Item [6]: The system according to any one of items [1]-[5], wherein: the second authentication list may further specify one or more network entities that are authenticated with a third network entity; and the third network entity may be authenticated with the second network entity.

Item [7]: The system according to any one of items [1]-[6], wherein: the first authentication list may specify one or more first MAC address of one or more ports of the first network entity, one or more third MAC address of one or more ports of one or more network entities authenticated with the one or more first MAC address, and a role of the one or more ports of the first network entity; the second authentication list may specify one or more second MAC address of one or more ports of the second network entity, one or more fourth MAC address of one or more ports of one or more network entities authenticated with the one or more second MAC address, and a role of the one or more ports of the second network entity; and the role may include one of an authenticator and a supplicant.

Item [8]: The system according to any one of items [1]-[7], wherein an authentication between the first network entity, the second network entity, and the one or more network entities may be based on a port-based network access control IEEE 802.1x.

Item [9]: The system according to any one of items [1]-[8], wherein the first network entity, the second network entity, and the one or more network entities may include at least one of O-CU, O-DU, O-RU, and Transport Network elements.

Item [10]: A system that may include: a memory storage storing computer-executable instructions; and at least one processor communicatively coupled to the memory storage, wherein the at least one processor may be configured to execute the instructions to: receive a first authentication list from a first network entity, wherein the first authentication list specifies one or more network entities that are authenticated with the first network entity; receive a second authentication list from the second network entity, wherein the second authentication list specifies one or more network entities that are authenticated with the second network entity, and wherein the first network entity and the second network entity are authenticated with each other; and create a trust list for the first network entity based on the first authentication list and the second authentication list, wherein the trust list for the first network entity specifies a trust level between the first network entity and one or more network entities in the first and second authentication lists.

Item [11]: A method that may include: creating a first authentication list for a first network entity, wherein the first authentication list specifies one or more network entities that are authenticated with the first network entity; receiving a second authentication list from a second network entity, wherein the second authentication list specifies one or more network entities that are authenticated with the second network entity, and wherein the first network entity and the second network entity are authenticated with each other; and creating a trust list for the first network entity based on the first authentication list and the second authentication list, wherein the trust list for the first network entity specifies a trust level between the first network entity and one or more network entities in the first and second authentication lists.

Item [12]: The method according to item [11], wherein: the trust level may include one of direct trust and indirect trust; and the trust level may be between one or more ports of the first network entity and one or more ports of the one or more network entities in the first and second authentication lists that has a role of a supplicant.

Item [13]: The method according to item [12], wherein the trust list for the first network entity may include one or more MAC address of the one or more ports of the first network entity and one or more MAC address of the one or more ports of the one or more network entities in the first and second authentication lists that has the role of the supplicant.

Item [14]: The method according to any one of items [11]-[13], wherein the creating the trust list for the first network entity based on the first authentication list and the second authentication list may include: creating the trust list based on the first authentication list, such that the trust list specifies a trust level between the first network entity and the one or more network entities in the first authentication list; in response to receiving the second authentication list, updating the first authentication list to include the second authentication list; and updating the trust list based on the updated first authentication list, such that the trust list further specifies a trust level between the first network entity and the one or more network entities in the second authentication list.

Item [15]: The method according to item [14], may further include transmitting the updated first authentication list to the one or more network entities that are authenticated with the first network entity.

Item [16]: The system according to any one of items [11]-[15], wherein: the second authentication list may further specify one or more network entities that are authenticated with a third network entity; and the third network entity may be authenticated with the second network entity.

Item [17]: The method according to any one of items [11]-[16], wherein: the first authentication list may specify one or more first MAC address of one or more ports of the first network entity, one or more third MAC address of one or more ports of one or more network entities authenticated with the one or more first MAC address, and a role of the one or more ports of the first network entity; the second authentication list may specify one or more second MAC address of one or more ports of the second network entity, one or more fourth MAC address of one or more ports of one or more network entities authenticated with the one or more second MAC address, and a role of the one or more ports of the second network entity; and the role may include one of an authenticator and a supplicant.

Item [18]: The method according to any one of items [11]-[17], wherein an authentication between the first network entity, the second network entity, and the one or more network entities may be based on a port-based network access control IEEE 802.1x.

Item [19]: The method according to any one of items [11]-[18], wherein the first network entity, the second network entity, and the one or more network entities may include at least one of O-CU, O-DU, O-RU, and Transport Network elements.

Item [20]: A method that may include: receiving a first authentication list from a first network entity, wherein the first authentication list specifies one or more network entities that are authenticated with the first network entity; receiving a second authentication list from the second network entity, wherein the second authentication list specifies one or more network entities that are authenticated with the second network entity, and wherein the first network entity and the second network entity are authenticated with each other; and creating a trust list for the first network entity based on the first authentication list and the second authentication list, wherein the trust list for the first network entity specifies a trust level between the first network entity and one or more network entities in the first and second authentication lists.

It can be understood that numerous modifications and variations of the present disclosure are possible in light of the above teachings. It will be apparent that within the scope of the appended clauses, the present disclosures may be practiced otherwise than as specifically described herein.

What is claimed is:

1. A system comprising:
at least one memory storage storing computer-executable instructions; and
at least one processor communicatively coupled to the at least one memory storage, wherein the at least one processor is configured to execute the instructions to:
create a first authentication list for a first network entity, wherein the first authentication list specifies one or more network entities that are authenticated with the first network entity;
receive a second authentication list from a second network entity, wherein the second authentication list specifies one or more network entities that are authenticated with the second network entity, and wherein the first network entity and the second network entity are authenticated with each other; and
create a trust list for the first network entity based on the first authentication list and the second authentication list, wherein the trust list for the first network entity specifies a trust level between the first network entity and one or more network entities in the first and second authentication lists,
wherein Zero Trust communication between the first network entity and the one or more network entities in the first and second authentication lists is performed based on trust relationships corresponding to the trust list and based on the first authentication list and the second authentication list, and
wherein the trust list comprises the trust level that is determined and specified in the trust list as either a direct trust or an indirect trust, as well as one or more medium access control (MAC) address of one or more ports of the first network entity and one or more MAC address of one or more ports of the one or more network entities in the first and second authentication lists that has a role of a supplicant.

2. The system according to claim 1, wherein:
the trust level is between the one or more ports of the first network entity and the one or more ports of the one or more network entities in the first and second authentication lists that has the role of the supplicant.

3. The system according to claim 1, wherein the at least one processor is configured to execute the instructions to create the trust list for the first network entity based on the first authentication list and the second authentication list by:
creating the trust list based on the first authentication list, such that the trust list specifies a first trust level between the first network entity and the one or more network entities in the first authentication list;

in response to receiving the second authentication list, updating the first authentication list to include the second authentication list; and
updating the trust list based on the updated first authentication list, such that the trust list further specifies an updated trust level between the first network entity and the one or more network entities in the second authentication list.

4. The system according to claim 3, wherein the at least one processor is further configured to execute the instructions to transmit the updated first authentication list to the one or more network entities that are authenticated with the first network entity.

5. The system according to claim 1, wherein:
the second authentication list further specifies one or more network entities that are authenticated with a third network entity; and
the third network entity is authenticated with the second network entity.

6. The system according to claim 1, wherein:
the first authentication list specifies one or more first medium access control (MAC) address of one or more ports of the first network entity, one or more third MAC address of one or more ports of one or more network entities authenticated with the one or more first MAC address, and a role of the one or more ports of the first network entity;
the second authentication list specifies one or more second MAC address of one or more ports of the second network entity, one or more fourth MAC address of one or more ports of one or more network entities authenticated with the one or more second MAC address, and a role of the one or more ports of the second network entity; and
the role comprises one of an authenticator and a supplicant.

7. The system according to claim 1, wherein an authentication between the first network entity, the second network entity, and the one or more network entities are based on a port-based network access control IEEE 802.1x.

8. The system according to claim 1, wherein the first network entity, the second network entity, and the one or more network entities comprise at least one of an Open Radio Access Network (O-RAN) Centralized Unit (O-CU), an O-RAN Distributed Unit (O-DU), an O-RAN Radio Unit (O-RU), and Transport Network elements.

9. A system comprising:
at least one memory storage storing computer-executable instructions; and
at least one processor communicatively coupled to the at least one memory storage, wherein the at least one processor is configured to execute the instructions to:
receive a first authentication list from a first network entity, wherein the first authentication list specifies one or more network entities that are authenticated with the first network entity;
receive a second authentication list from the second network entity, wherein the second authentication list specifies one or more network entities that are authenticated with the second network entity, and wherein the first network entity and the second network entity are authenticated with each other; and
create a trust list for the first network entity based on the first authentication list and the second authentication list, wherein the trust list for the first network entity specifies a trust level between the first network entity and one or more network entities in the first and second authentication lists, wherein Zero Trust communication between the first network entity and the one or more network entities in the first and second authentication lists is performed based on trust relationships corresponding to the trust list and based on the first authentication list and the second authentication list, and wherein the trust list comprises the trust level that is determined and specified in the trust list as either a direct trust or an indirect trust, as well as one or more medium access control (MAC) address of one or more ports of the first network entity and one or more MAC address of one or more ports of the one or more network entities in the first and second authentication lists that has a role of a supplicant.

10. A method comprising:

creating a first authentication list for a first network entity, wherein the first authentication list specifies one or more network entities that are authenticated with the first network entity;

receiving a second authentication list from a second network entity, wherein the second authentication list specifies one or more network entities that are authenticated with the second network entity, and wherein the first network entity and the second network entity are authenticated with each other; and creating a trust list for the first network entity based on the first authentication list and the second authentication list, wherein the trust list for the first network entity specifies a trust level between the first network entity and one or more network entities in the first and second authentication lists, wherein Zero Trust communication between the first network entity and the one or more network entities in the first and second authentication lists is performed based on trust relationships corresponding to the trust list and based on the first authentication list and the second authentication list, and wherein the trust list comprises the trust level that is determined and specified in the trust list as either a direct trust or an indirect trust, as well as one or more medium access control (MAC) address of one or more ports of the first network entity and one or more MAC address of one or more ports of the one or more network entities in the first and second authentication lists that has a role of a supplicant.

11. The method according to claim 10, wherein:

the trust level is between the one or more ports of the first network entity and the one or more ports of the one or more network entities in the first and second authentication lists that has the role of the supplicant.

12. The method according to claim 10, wherein the creating the trust list for the first network entity based on the first authentication list and the second authentication list comprises:

creating the trust list based on the first authentication list, such that the trust list specifies a first trust level between the first network entity and the one or more network entities in the first authentication list;

in response to receiving the second authentication list, updating the first authentication list to include the second authentication list; and updating the trust list based on the updated first authentication list, such that the trust list further specifies an updated trust level between the first network entity and the one or more network entities in the second authentication list.

13. The method according to claim 12, further comprising transmitting the updated first authentication list to the one or more network entities that are authenticated with the first network entity.

14. The method according to claim 10, wherein:

the second authentication list further specifies one or more network entities that are authenticated with a third network entity; and the third network entity is authenticated with the second network entity.

15. The method according to claim 10, wherein:

the first authentication list specifies one or more first medium access control (MAC) address of one or more ports of the first network entity, one or more third MAC address of one or more ports of one or more network entities authenticated with the one or more first MAC address, and a role of the one or more ports of the first network entity;

the second authentication list specifies one or more second MAC address of one or more ports of the second network entity, one or more fourth MAC address of one or more ports of one or more network entities authenticated with the one or more second MAC address, and a role of the one or more ports of the second network entity; and the role comprises one of an authenticator and a supplicant.

16. The method according to claim 10, wherein an authentication between the first network entity, the second network entity, and the one or more network entities are based on a port-based network access control IEEE 802.1x.

17. The method according to claim 10, wherein the first network entity, the second network entity, and the one or more network entities comprise at least one of an Open Radio Access Network (O-RAN) Centralized Unit (O-CU), an O-RAN Distributed Unit (O-DU), an O-RAN Radio Unit (O-RU), and Transport Network elements.

18. A method comprising:

receiving a first authentication list from a first network entity, wherein the first authentication list specifies one or more network entities that are authenticated with the first network entity;

receiving a second authentication list from the second network entity, wherein the second authentication list specifies one or more network entities that are authenticated with the second network entity, and wherein the first network entity and the second network entity are authenticated with each other; and creating a trust list for the first network entity based on the first authentication list and the second authentication list, wherein the trust list for the first network entity specifies a trust level between the first network entity and one or more network entities in the first and second authentication lists, wherein Zero Trust communication between the first network entity and the one or more network entities in the first and second authentication lists is performed based on trust relationships corresponding to the trust list and based on the first authentication list and the second authentication list, and wherein the trust list comprises the trust level that is determined and specified in the trust list as either a direct trust or an indirect trust, as well as one or more medium access control (MAC) address of one or more ports of the first network entity and one or more MAC address of one or more ports of the one or more network entities in the first and second authentication lists that has a role of a supplicant.

\* \* \* \* \*